US011976878B2

(12) United States Patent
Turney et al.

(10) Patent No.: US 11,976,878 B2
(45) Date of Patent: May 7, 2024

(54) FLEXIBLE PROCESS AND APPARATUS FOR THE LIQUEFACTION OF OXYGEN

(71) Applicant: L'Air Liquide, Société Anonyme pour l'Etude et l'Exploitation des Procédés Georges Claude, Paris (FR)

(72) Inventors: Michael A. Turney, Houston, TX (US); Alain Guillard, Houston, TX (US)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 213 days.

(21) Appl. No.: 17/713,710

(22) Filed: Apr. 5, 2022

(65) Prior Publication Data

US 2023/0068126 A1 Mar. 2, 2023

Related U.S. Application Data

(60) Provisional application No. 63/240,260, filed on Sep. 2, 2021.

(51) Int. Cl.
*F25J 1/00* (2006.01)
*F01D 15/00* (2006.01)
*F28D 7/00* (2006.01)

(52) U.S. Cl.
CPC .......... *F25J 1/0017* (2013.01); *F01D 15/005* (2013.01); *F25J 1/0072* (2013.01); *F28D 7/0075* (2013.01); *F05D 2220/30* (2013.01); *F05D 2260/213* (2013.01)

(58) Field of Classification Search
CPC ...... F25J 1/0017; F25J 1/0072; F01D 15/005; F28D 7/0075; F05D 2220/30; F05D 2260/213
USPC .......................................................... 62/646
See application file for complete search history.

(56) References Cited

U.S. PATENT DOCUMENTS 1,807,897 A * 6/1931 Cicali .................... C01B 3/506 62/634
4,662,919 A * 5/1987 Davis .................... F25J 3/0233 62/622
4,883,516 A * 11/1989 Layland ............... F25J 3/04393 62/651
4,968,337 A * 11/1990 Layland ............... F25J 3/04278 62/651
5,146,756 A * 9/1992 Lavin .................. F25J 3/04187 62/646

(Continued)

*Primary Examiner* — Jon T. Schermerhorn, Jr.
(74) *Attorney, Agent, or Firm* — Elwood L. Haynes

(57) ABSTRACT

A system and method for cooling an oxygen stream by heat exchange with a warming supply nitrogen stream having of a heat exchanger having at least a Zone A and a Zone B, the system having indirect heat exchange between a gaseous oxygen stream, and a high-pressure liquid nitrogen stream split into at least a first portion which passes through a Zone A, and a second portion which passes through a Zone B during a first phase of operation. And a high-pressure liquid nitrogen stream passing through Zone A, thereby producing a high-pressure nitrogen vapor stream, which passes through an expansion turbine, thereby producing an expansion turbine outlet stream which then passes through Zone B, during a second phase of operation, thereby producing a liquid oxygen stream.

12 Claims, 7 Drawing Sheets

(56) References Cited

U.S. PATENT DOCUMENTS

| | | | | |
|---|---|---|---|---|
| 5,207,067 | A * | 5/1993 | Acharya | F25J 3/04296 62/651 |
| 11,150,016 | B2 * | 10/2021 | Hirose | F25J 3/04187 |
| 11,493,270 | B2 * | 11/2022 | Prosser | F25J 1/0221 |

* cited by examiner

Phase 1

Phase 2

FLEXIBLE PROCESS AND APPARATUS FOR THE LIQUEFACTION OF OXYGEN

CROSS REFERENCE TO RELATED APPLICATIONS

This application claims the benefit of priority under 35 U.S.C. § 119 (a) and (b) to U.S. Patent Application No. 63/240,260, filed Sep. 2, 2021, the entire contents of which are incorporated herein by reference.

BACKGROUND

It is desirable to install a system for condensing gaseous oxygen against vaporizing liquid nitrogen as an efficient system with short delivery time or by phasing the equipment installation over time to delay a portion of the equipment cost. Rotating equipment (i.e. turbo-expander) typically have long delivery times compared to the shorter delivery times for exchangers and other ancillary equipment. It is therefore desirable to commission the system in phases such that production is made early (i.e. Phase 1 without an expansion turbine) and an expansion turbine is added later (Phase 2) to improve performance. Similarly, it is desirable, for reliability, to be able to operate efficiently without the turbine.

SUMMARY

A system for cooling an oxygen stream by indirect heat exchange with a warm nitrogen stream, the system including a first operating mode without a nitrogen expansion turbine and a second operating mode with a nitrogen expansion turbine, in the first operating mode. The supply nitrogen stream is split into at least two portions with a first portion passing through a heat exchanger passage A and a second portion passing through a heat exchanger passage B. In the second operating mode, warming of a nitrogen stream in the heat exchanger passage A, and admitting the warmed nitrogen into to a turbine inlet, and warming a turbine outlet nitrogen stream in the heat exchange passage B. Wherein, all heat exchanger passages have at least some flow during both the first operating mode and the second operating mode.

A method for cooling an oxygen stream by heat exchange with a warming supply nitrogen stream having of a heat exchanger having at least a Zone A and a Zone B, the system having indirect heat exchange between a gaseous oxygen stream, and a high-pressure liquid nitrogen stream split into at least a first portion which passes through a Zone A, and a second portion which passes through a Zone B during a first phase of operation. And a high-pressure liquid nitrogen stream passing through Zone A, thereby producing a high-pressure nitrogen vapor stream, which passes through an expansion turbine, thereby producing an expansion turbine outlet stream which then passes through Zone B, during a second phase of operation, thereby producing a liquid oxygen stream.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

ELEMENT NUMBERS

Figure 1:
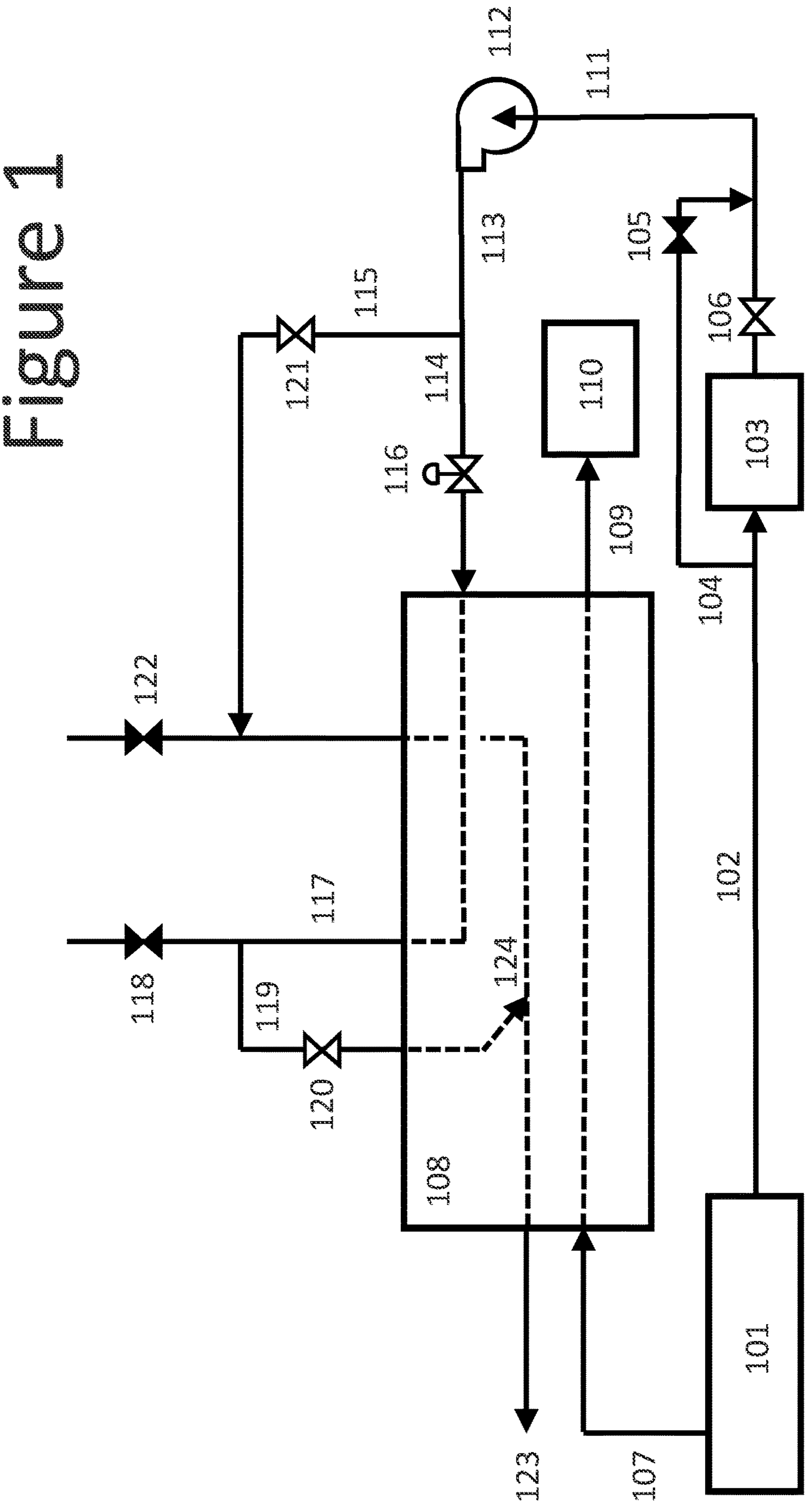
FIG. 1 is a schematic representation of the system during Phase 1, in accordance with one embodiment of the present invention.

101=air separation unit+nitrogen liquefaction unit
102=liquid nitrogen stream
103=liquid nitrogen storage tank
104=liquid nitrogen stream bypass line
105=liquid nitrogen stream bypass line block valve
106=liquid nitrogen stream block valve
107=gaseous oxygen inlet stream
108=heat exchanger
109=liquid oxygen outlet stream
110=liquid oxygen storage tank
111=liquid nitrogen inlet stream
112=liquid nitrogen pump
113=high-pressure liquid nitrogen stream
114=first liquid portion (of high-pressure liquid nitrogen stream)
115=second liquid portion (of high-pressure liquid nitrogen stream)
116=liquid nitrogen flow control valve
117=high-pressure nitrogen vapor stream
118=first block valve
119=expansion turbine bypass stream
120=second block valve
121=third block valve
122=fourth block valve
123=nitrogen vapor outlet stream
124=Internal heat exchanger junction
201=expansion turbine inlet stream
202=expansion turbine
203=expansion turbine outlet stream

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 3:
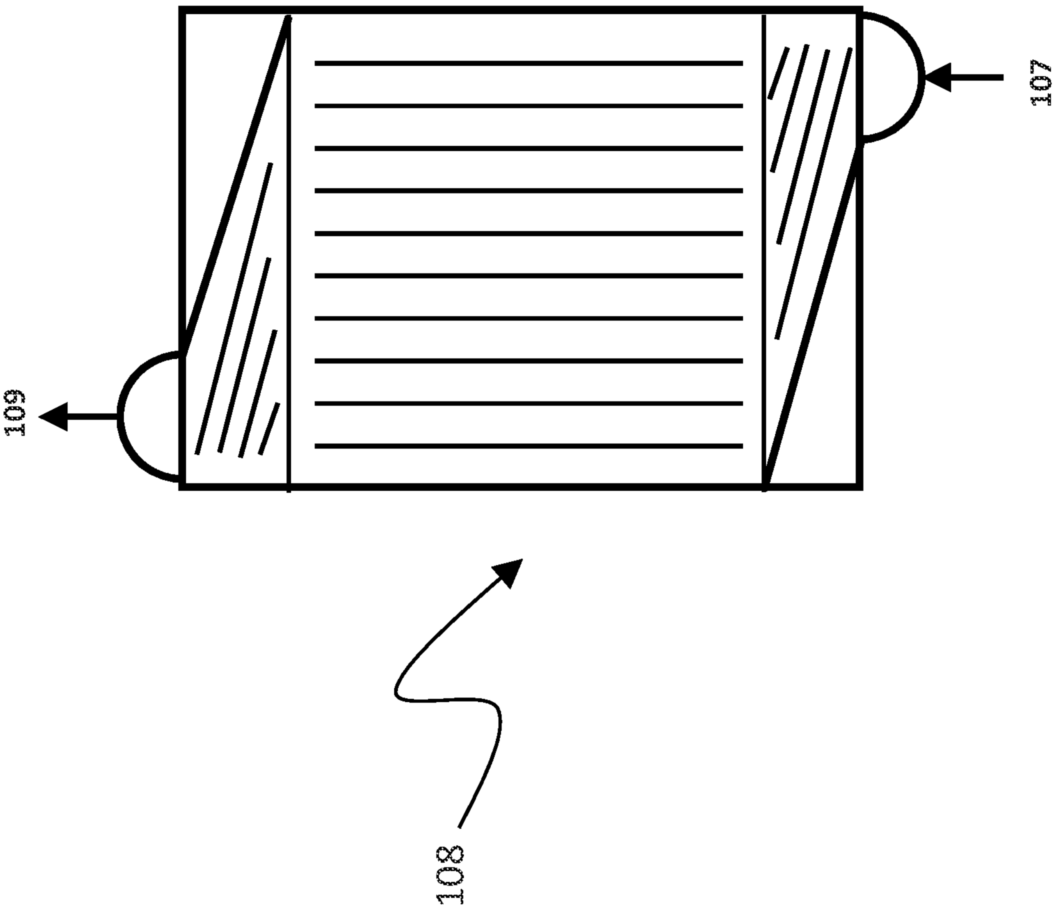
FIG. 3 is a schematic representation of the layer that will convey the gaseous oxygen inlet stream through the heat exchanger, in accordance with one embodiment of the present invention.
Figure 4:
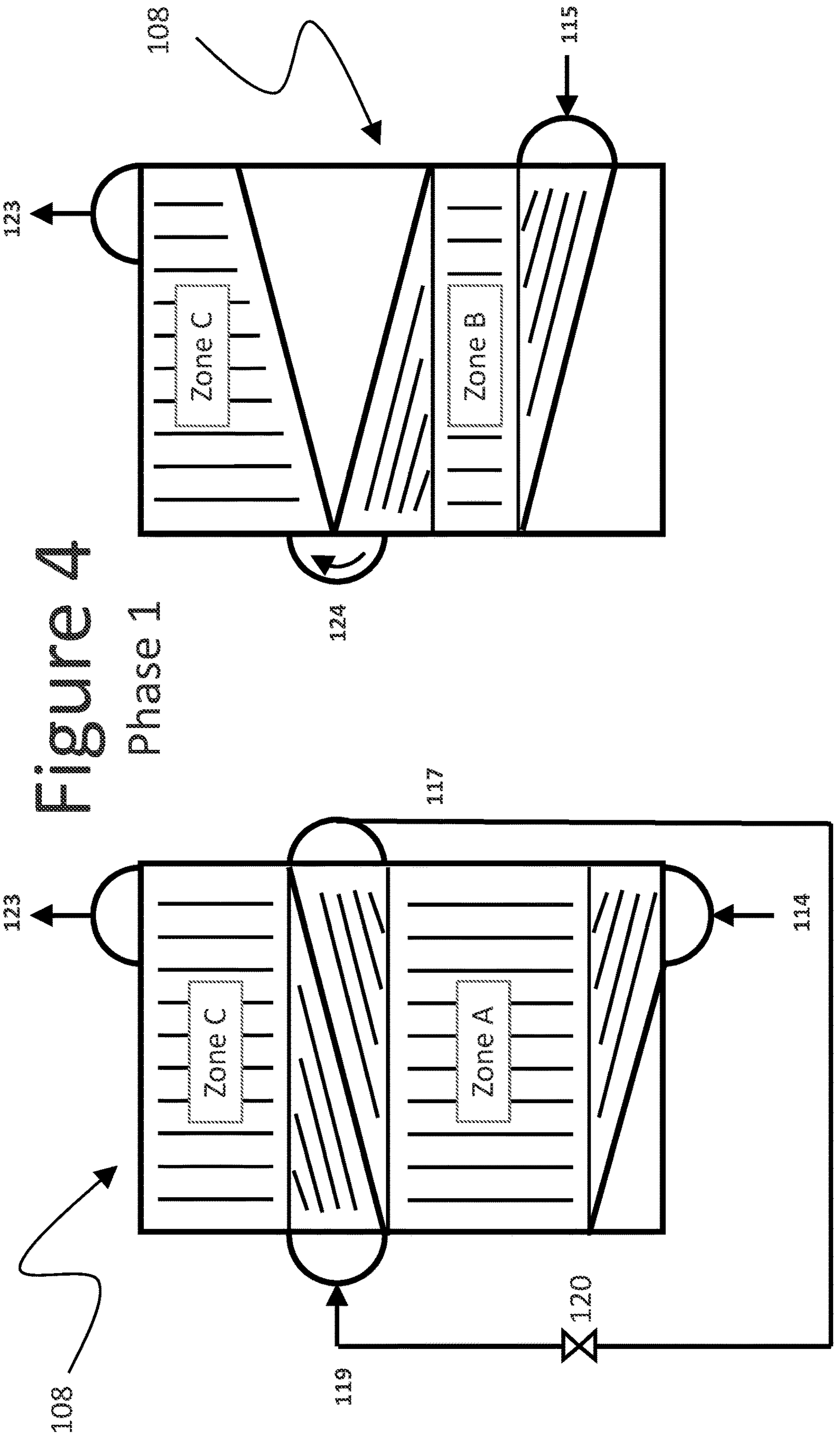
FIG. 4 is a schematic representation of the two layers that will convey the various nitrogen streams through the heat exchanger during Phase 1, in accordance with one embodiment of the present invention
Figure 6:
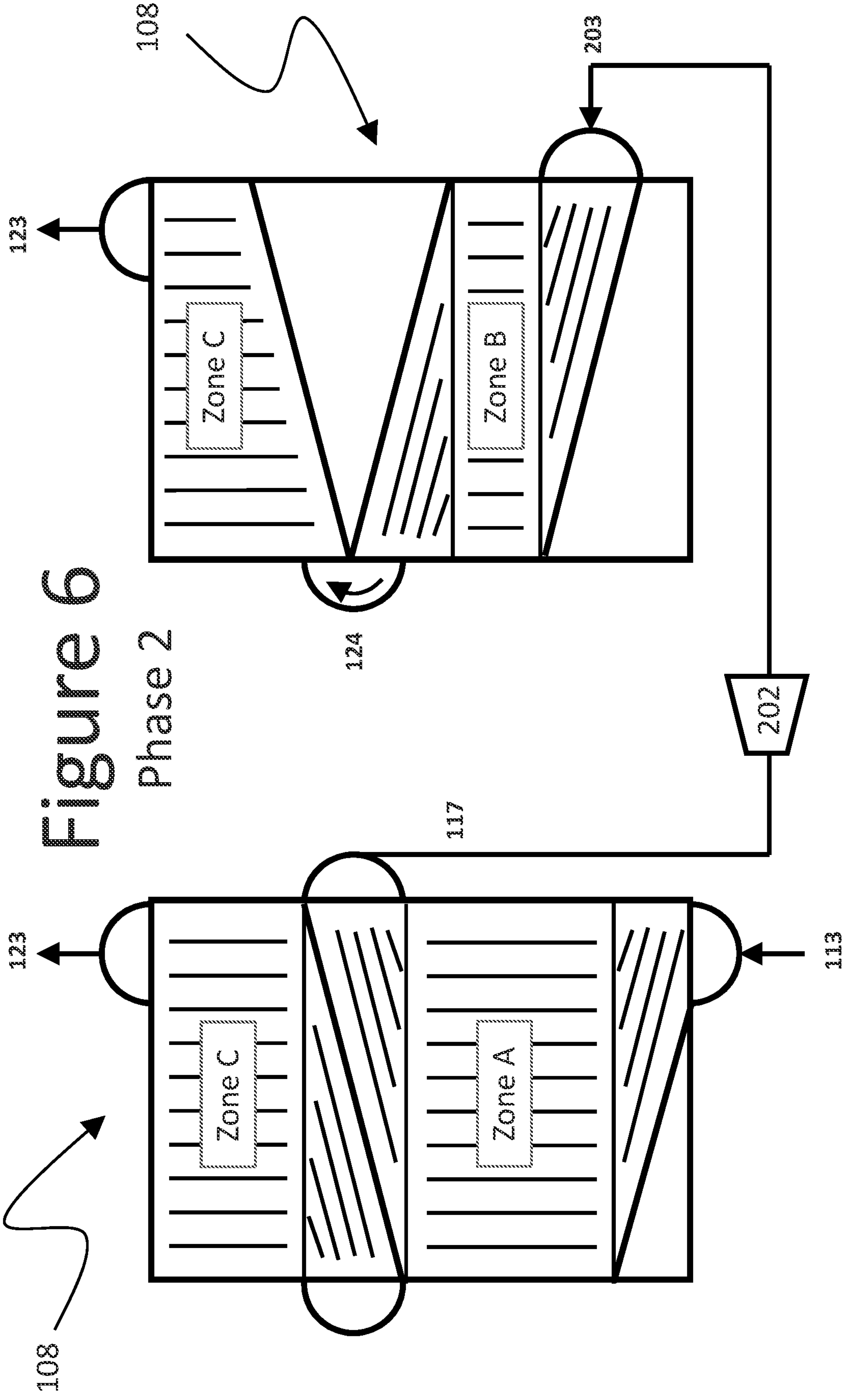
FIG. 6 is a schematic representation of the two layers that will convey the various nitrogen streams through the heat exchanger during Phase 2, in accordance with one embodiment of the present invention

As an overview, heat exchanger 108 must be designed during Phase 1 to accommodate operation during Phase 2. Heat exchanger 108 is basically assembled from three unique and different layers, which are stacked together. The first layer, as illustrated in FIG. 3 and discussed below, accepts gaseous oxygen stream 107 and discharges liquid oxygen stream 109. The second layer, as illustrated in FIGS. 4 and 6, has two distinct zones, Zone A and Zone B, (passage A and passage B) which function as described below. And the third layer, also illustrated in FIGS. 4 and 6, had two distinct zones Zone B and Zone C, which function as described below. Zone A, Zone B, Zone C and the layer that conveys the oxygen stream contain a multitude of heat exchanger passages, as would be familiar to one of ordinary skill in the art.

One important feature of this design is that during Phase 1 and during Phase 2, none of the passages "run dry", and experience at least some flow at all times. In one embodiment of the present invention, the passages in Zone A and the passages in Zone B are in parallel through at least part of the heat exchanger. In one embodiment of the present invention, the passages of Zone A, Zone B, and Zone C, as well as the layer that conveys the oxygen stream, have more than one layer within the heat exchanger.

Figure 2:
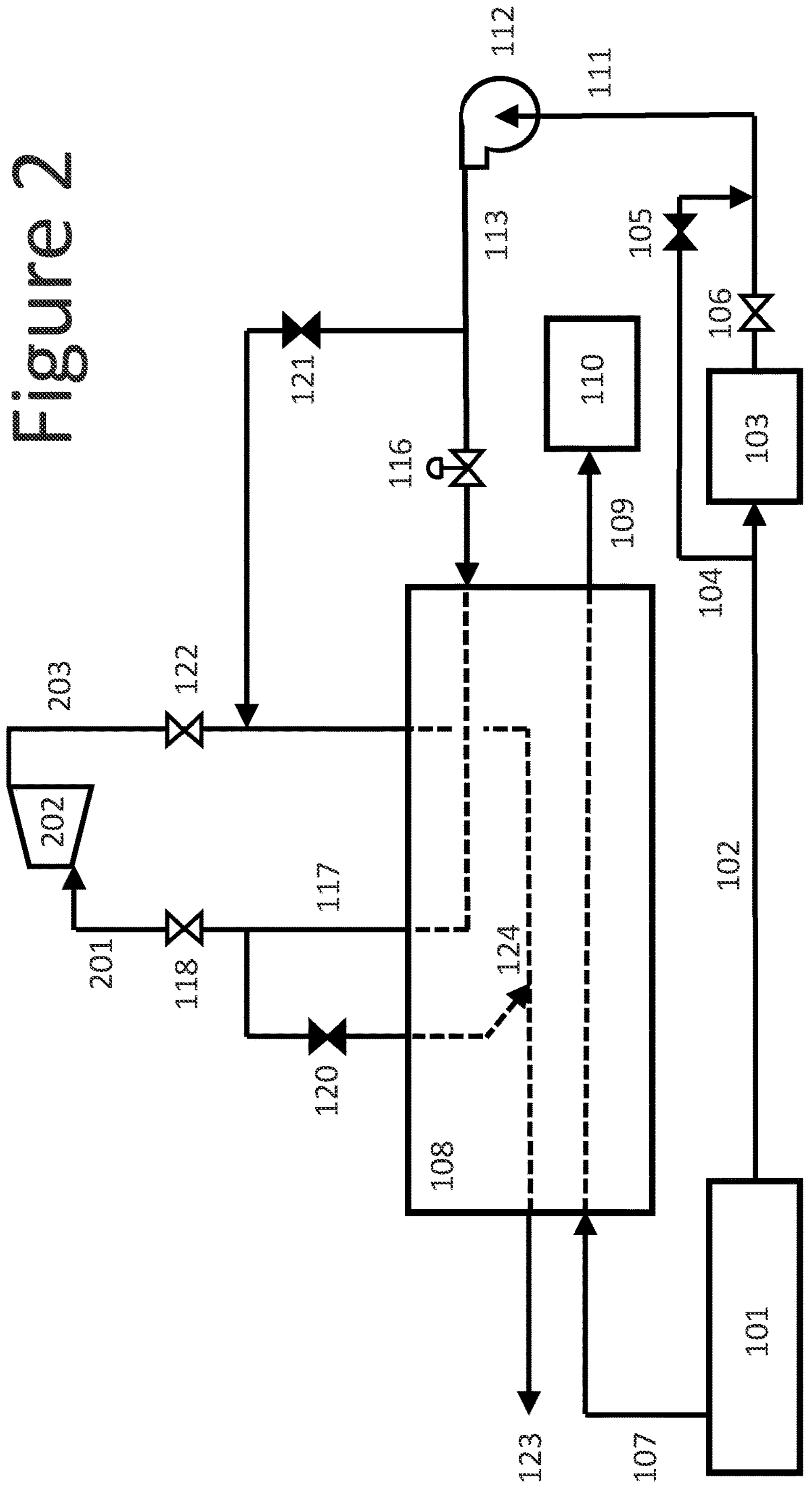
FIG. 2 is a schematic representation of the system during Phase 2, in accordance with one embodiment of the present invention.

With reference to FIG. 1 and FIG. 2, Phase 1 is defined as having no expansion turbine, whereas Phase 2 is defined as having expansion turbine 202. Specifically in Phase 2 the layers within heat exchanger 108 for warming first portion high-pressure liquid nitrogen stream 114 from approximately −193 C to approximately −98 C (Zone A) are in parallel to the layers for warming expansion turbine outlet stream 203 from approximately −175 C to −98 C (Zone B) followed by warming from −98 C to 18C in Zone C. However, during Phase 1 these same layers must also accommodate the single stream warming of expansion turbine bypass stream 119 from approximately −193 C to 13 C without having layers without flow (dead layers) which would result in undesired thermal inefficiency within the heat exchange due to an insulating effect of the dead layers.

To accomplish this, during Phase 1, high-pressure nitrogen stream 113 from liquid nitrogen pump 112 is split. Portion 1 114 and portion 2 115 are delivered to two different exchanger passages where the high-pressure nitrogen streams are warmed in parallel passages to approximately −98 C (header location for turbine inlet temperature of Phase 2). The two portions are then remixed and warming is continued until exiting as nitrogen vapor outlet stream 123 from the warm end of heat exchanger 108. The flow split between the two passages will be naturally defined by the equal pressure drop between the two circuits.

Turning to FIG. 1, the system during Phase 1 is illustrated. Air separation unit and nitrogen liquefaction unit 101 provide liquid nitrogen stream 102 and gaseous oxygen inlet stream 107. The air separation unit may be either existing or new design with minimal flexibility in LOX production range. Air separation unit and nitrogen liquefaction unit 101 may be any system known in the art and may be two separate installations or a single integrated system. Liquid nitrogen stream 102 is then typically introduced to liquid nitrogen storage tank 103, from which liquid nitrogen inlet stream 111 is removed. Liquid nitrogen stream 102 may bypass liquid nitrogen storage tank 103, utilizing liquid nitrogen stream bypass line 104 liquid nitrogen stream bypass line block valve 105, and liquid nitrogen stream block valve 106. In other embodiments, gaseous oxygens inlet stream 107 and liquid nitrogen inlet stream 111 may be provided by any available source, such as a local pipeline, tanker truck, rail or other source known in the art and may be located at a remote facility without an air separation unit.

Liquid nitrogen inlet stream 111 then is elevated in pressure in liquid nitrogen pump 112, thus becoming high-pressure liquid nitrogen stream 113. In Phase 1, high-pressure liquid nitrogen stream 113 is split into first liquid portion 114 and second liquid portion 115. First liquid portion 114 passes through liquid nitrogen flow control valve 116 and enters heat exchanger 108 in liquid phase. First liquid portion 114 passes partially through heat exchanger 108 wherein it experiences a phase change and exits as high-pressure nitrogen vapor stream 117. In Phase 2, high-pressure nitrogen vapor stream 117 enters expansion turbine 202. However, in Phase 1, the flow of high-pressure nitrogen vapor stream 117 is blocked by closed first block valve 118 or piping cap, and the entirety of expansion turbine bypass stream 119 passes through second block valve 120. Expansion turbine bypass stream 119 then reenters heat exchanger 108.

Second liquid portion 115 passes through third block valve 121, and in Phase 1 is blocked by closed fourth block valve 122 or piping cap, and the entirety of second liquid portion 115 reenters heat exchanger 108 in liquid phase. During Phase 1, second liquid portion 115 enters exchanger 108 then experiences a phase change and combines within heat exchanger 108 with expansion turbine bypass stream 119 at internal heat exchanger junction 124, thus forming nitrogen outlet vapor stream 123, which exits heat exchanger 108. Simultaneously, gaseous oxygen inlet stream 107 enters heat exchanger 108 and by exchanging heat with the various nitrogen streams, is cooled and condensed into liquid oxygen outlet stream 109, which enters liquid oxygen storage tank 110.

Turning to FIG. 2, the system during Phase 2 is illustrated. Air separation unit and nitrogen liquefaction unit 101 provide liquid nitrogen stream 102 and gaseous oxygen inlet stream 107. Air separation unit and nitrogen liquefaction unit 101 may be any system known in the art and may be two separate installations or a single integrated system. Liquid nitrogen stream 102 is then typically introduced to liquid nitrogen storage tank 103, from which liquid nitrogen inlet stream 111 is removed. Liquid nitrogen stream 102 may bypass liquid nitrogen storage tank 103, utilizing liquid nitrogen stream bypass line 104, liquid nitrogen stream bypass line block valve 105, and liquid nitrogen stream block valve 106. In other embodiments, gaseous oxygens inlet stream 107 and liquid nitrogen inlet stream 111 may be provided by any available source, such as a local pipeline, tanker truck, rail, or other source known in the art and may be located at a remote facility without an air separation unit.

Liquid nitrogen inlet stream 111 then is elevated in pressure in liquid nitrogen pump 112, thus becoming high-pressure liquid nitrogen stream 113. In Phase 2 the entirety of high-pressure liquid nitrogen stream 113 passes through liquid nitrogen flow control valve 116 and enters heat exchanger 108 in liquid phase. High-pressure liquid nitrogen stream 113 passes partially through heat exchanger 108 wherein it experiences a phase change and exits as high-pressure nitrogen vapor stream 117. In Phase 2, high-pressure nitrogen vapor stream 117 passes through first block valve 118, becoming expansion turbine inlet stream 201. In Phase 2, the entirety of expansion turbine inlet stream 201 enters expansion turbine 202. Expansion turbine inlet stream 201 is expanded and cooled in expansion turbine 202 and exit as expansion turbine outlet stream 203. Expansion turbine outlet stream 203 then passes through fourth block valve 122 and reenters heat exchanger 108. Expansion turbine outlet stream 203 passes through heat exchanger 108 and exits as nitrogen outlet vapor stream 123. Simultaneously, gaseous oxygen inlet stream 107 enters heat exchanger 108 and by exchanging heat with the various nitrogen streams, is cooled and condensed into liquid oxygen outlet stream 109, which enters liquid oxygen storage tank 110.

Turning to FIGS. 3-6, one embodiment of heat exchanger 108 in accordance with the above-described invention is presented. FIGS. 3, 4, and 6 represent the various layers that are stacked within heat exchanger 108. The precise stacking order and respective quantities of each layer would be clear to one of ordinary skill in the art without undue experimentation, and therefore will not be addressed.

FIG. 3 illustrates one possible embodiment of the layer that will convey gaseous oxygen inlet stream 107 through heat exchanger 108, wherein it will exchange heat with the various nitrogen streams, change phase, and exit as liquid oxygen outlet stream 109.

FIG. 4 illustrates one possible arrangement of the two layers that will convey the various nitrogen streams through heat exchanger 108 during Phase 1. For convenience, these two layers are generally divided into three distinct heat transfer zones. Zone A is defined as the region into which high-pressure first liquid portion 114 enters and high-pressure nitrogen vapor stream 117 exits. Zone B is defined as the region into which high-pressure second liquid portion 115 enter and exits into internal heat exchanger junction 124. Zone C is defined as both the region where high-pressure expansion turbine bypass stream 119 enters one layer and simultaneously flows through that layer and through internal heat exchanger junction 124 and into the other layer. Both of these exit their respective layers as nitrogen vapor outlet stream 123.

Figure 5:
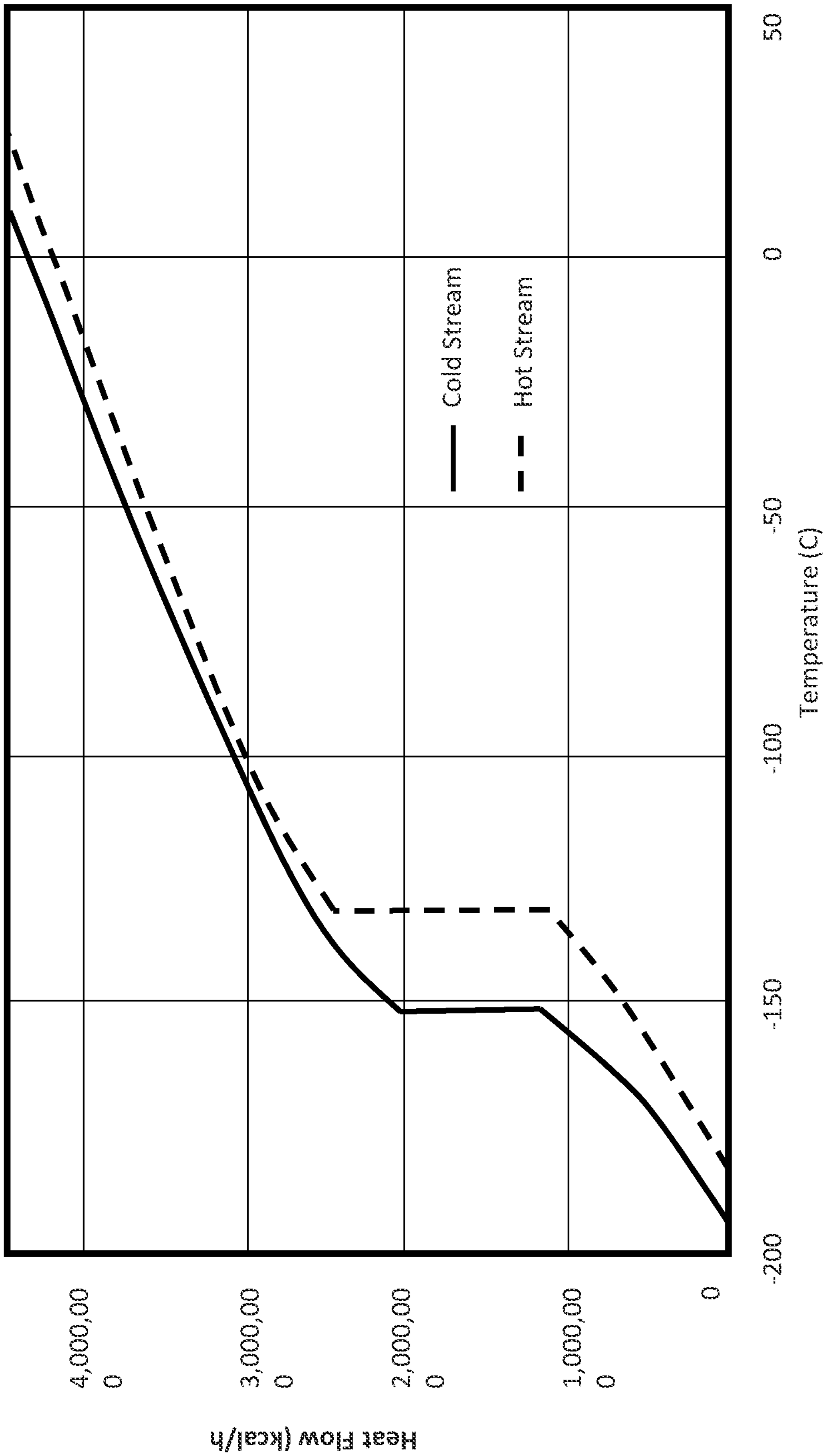
FIG. 5 is a graph which indicates the heat flow through the heat exchanger as a function of temperature during Phase 1, in accordance with one embodiment of the present invention.

FIG. 5 is a graph which indicates the heat flow through the heat exchanger as a function of temperature, for the heat exchanger layers described above during Phase 1. The solid line represents the aggregate of the various nitrogen (i.e. "cold") streams, and the dashed line represents the oxygen (i.e. "hot") stream. One of ordinary skill in the art would recognize that the closer these two curves are to one another, in particular the gap between the two vertical lines (which represent phase changes within the heat exchanger), is an indication of a well-designed and efficient heat exchanger function.

FIG. 6 illustrates one possible arrangement of the two layers that will convey the various nitrogen streams through heat exchanger 108 during Phase 2. As above, for convenience, these two layers are generally divided into three distinct heat transfer zones. Zone A is defined as the region into which high-pressure liquid nitrogen stream 113 enters and high-pressure nitrogen vapor stream 117 exits. Zone B is defined as the region into which low-pressure second liquid portion 203, after passing through expansion turbine 202, enter and exits into internal heat exchanger junction 124. Zone C is defined as both the region where low-pressure expansion turbine bypass stream 203 simultaneously flows through that layer and through internal heat exchanger junction 124 and into the other layer. Both of these exit their respective layers as nitrogen vapor outlet stream 123.

Figure 7:
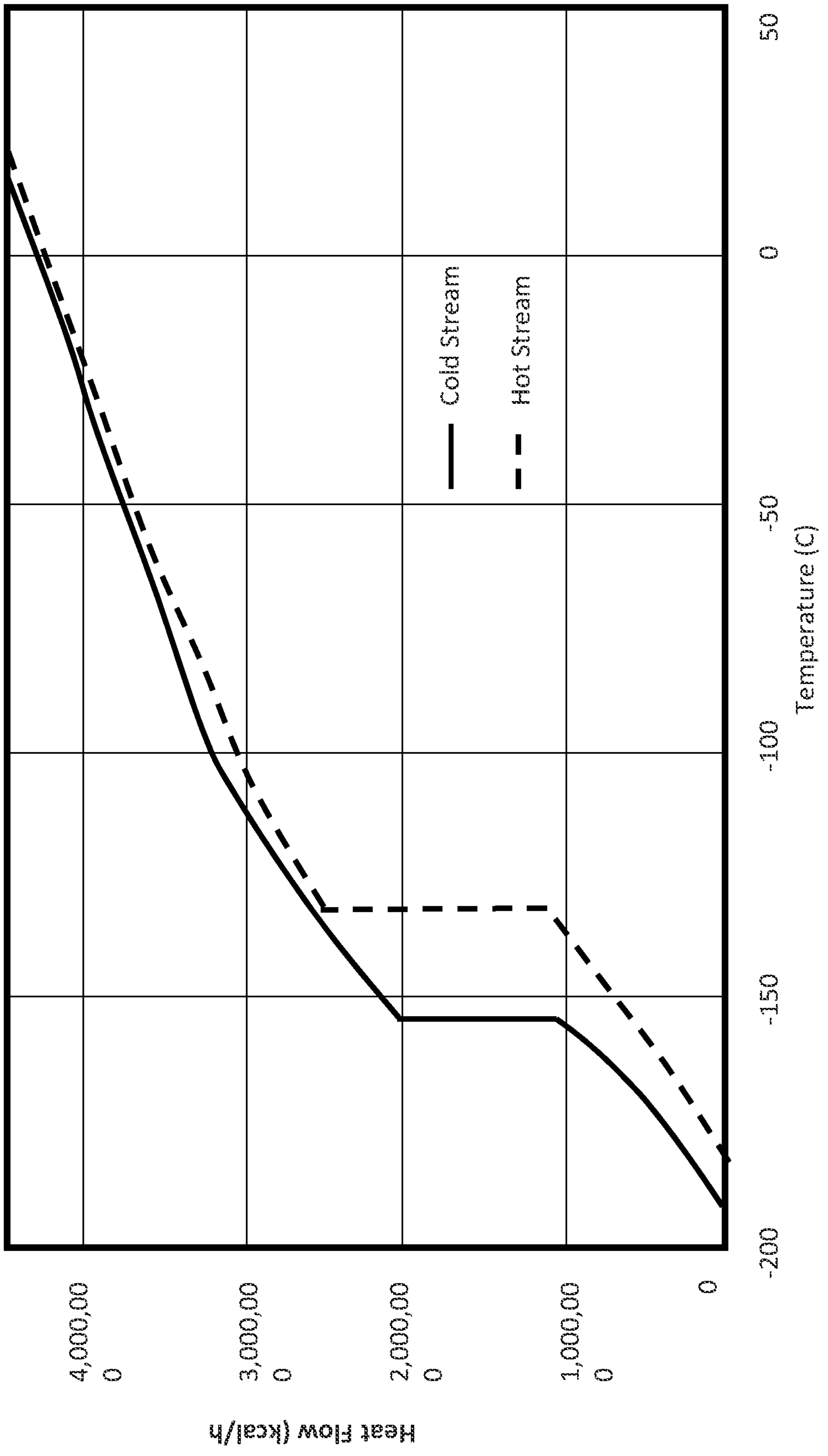
FIG. 7 is a graph which indicates the heat flow through the heat exchanger as a function of temperature during Phase 2, in accordance with one embodiment of the present invention.

FIG. 7 is a graph which indicates the heat flow through the heat exchanger as a function of temperature, for the heat exchanger layers described above during Phase 2. As before, the solid line represents the aggregate of the various nitrogen (i.e. "cold") streams, and the dashed line represents the oxygen (i.e. "hot") stream. One of ordinary skill in the art would recognize that these two curves are virtually identical to the two curves shown in FIG. 5, and that this is an indication of a heat exchanger that will be efficient and effective during Phase 1 as well as Phase 2.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A system for cooling an oxygen stream by indirect heat exchange with a warm nitrogen stream, the system consisting of:

a first operating mode without a nitrogen expansion turbine and a second operating mode with a nitrogen expansion turbine, in the first operating mode, the supply nitrogen stream is split into at least two portions with a first portion passing through a heat exchanger passage A and a second portion passing through a heat exchanger passage B in the second operating mode, warming of a nitrogen stream in the heat exchanger passage A, and admitting the warmed nitrogen into to a turbine inlet, and warming a turbine outlet nitrogen stream in the heat exchange passage B, wherein, all heat exchanger passages have at least some flow during both the first operating mode and the second operating mode.

2. Claim 1 where heat exchanger passages A and B are in parallel for at least a portion of the heat exchange.

3. Claim 1 where heat exchanger passages A and B each have more than one layer.

4. Claim 1 where the system is designed for phased installation where Phase 1 consists of operating mode 1 and potential/future Phase 2 consists of operating mode 2.

5. Claim 1 where heat exchanger passage A outlet and heat exchanger passage B outlet are combined/mixed before further warming in a heat exchanger passage C against cooling oxygen.

6. Claim 5 where at least a portion of the heat exchanger passage C is in the same layers as heat exchanger passage A and heat exchanger passage B.

7. A method for cooling an oxygen stream by heat exchange with a warming supply nitrogen stream consisting of a heat exchanger comprising at least a Zone A and a Zone B, the system comprising indirect heat exchange between a gaseous oxygen stream, and a high-pressure liquid nitrogen stream split into at least a first portion which passes through a Zone A, and a second portion which passes through a Zone B during a first phase of operation, and a high-pressure liquid nitrogen stream passing through Zone A, thereby producing a high-pressure nitrogen vapor stream, which passes through an expansion turbine, thereby producing an expansion turbine outlet stream which then passes through Zone B, during a second phase of operation, thereby producing a liquid oxygen stream.

8. The method of claim 7, wherein Zone A and Zone B comprise heat exchanger passage, and wherein all heat exchanger passages have at least some oxygen stream or nitrogen stream flow during both the first phase of operation and the second phase of operation.

9. The method of claim 7, wherein Zone A and Zone B comprise heat exchanger passage, and wherein the passages within Zone A and the passages within Zone B are in parallel in at least a portion of the heat exchanger.

10. The method of claim 7, wherein Zone A and Zone B comprise more than one layer each.

11. The method of claim 7, wherein the nitrogen outlet streams from Zone A and Zone B are combined and the combined stream passes through a Zone C, which is also in indirect heat exchange with the gaseous oxygen stream.

12. The method of claim 11, wherein at least a portion of Zone C is in the same layer as Zone A and Zone B.

* * * * *